Patented May 22, 1934

1,959,748

UNITED STATES PATENT OFFICE 1,959,748

PRODUCTION OF PRECIPITATED SILICA

Svend S. Svendsen, Madison, Wis., assignor to Clay Production Company, Chicago, Ill., a corporation of Illinois No Drawing. Application June 8, 1931, Serial No. 543,027

23 Claims. (Cl. 23—182)

The present invention relates to improvements in the production of precipitated silica. It is a continuation in part of my prior application 242,291, filed December 23, 1927, issued as Patent 1,859,998 on May 24, 1932, and my prior application Serial No. 425,671, filed February 3, 1930.

In accordance with the present invention, I prepare a precipitated silica by the reaction of silicondiammino tetrafluoride with water, which reaction may, if desired, be carried out in the presence of ammonia or water soluble salts dissolved in the water.

In my prior applications above referred to, as well as in my application Serial No. 425,345, filed February 1, 1930, I have described a suitable method of production of silicon diammino tetrafluoride, this compound having the formula $Si(NH_3)_2F_4$. This compound may be produced by the reaction of ammonium fluoride compounds or of reaction mixtures producing ammonium fluoride upon silicious compounds such as clay, quartz, and the like, in suitable reaction proportions, and also by the reaction of ammonium fluosilicate upon silica. The silicon diammino tetrafluoride is secured by volatilization from the reaction mixture, and may be subjected to further treatment in accordance with the present invention either in vapor form or as a solid, secured by condensation and collection from the vapors.

In carrying out the present invention, silicon diammino tetrafluoride, either in vapor or solid form, is caused to contact with water or an aqueous liquid under conditions controlled in accordance with the desired character of the silica product. In the reaction between silicon diammino tetrafluoride and water, a hydrated silica, together with ammonium silicofluoride and ammonium fluoride, are formed in accordance with the following empirical reaction.

(1)

$2Si(NH_3)_2F_4 + 2H_2O = SiO_2 + (NH_4)_2SiF_6 + 2NH_4F$

In the above empirical equation, the water of hydration of the silica product has not been taken into consideration.

I have found that, to secure the hydrated silica product in a proper and suitable condition for use as hereinafter described, the temperature at which the reaction of the water upon the silicon diammino tetrafluoride is conducted should be above 34° C., the reaction mixture being heated to secure a desired temperature of from 34° C. to the boiling point of the liquid and to compensate for the heat absorbed in the reaction, which is endothermic. When carried out under these conditions, the reaction as above described is modified, the ammonium fluoride formed reacting with some of the silica to form additional ammonium fluosilicate. The final reaction, when this action is complete, is as follows:

(2)

$3Si(NH_3)_2F_4 + 2H_2O = SiO_2 + 2(NH_4)_2SiF_6 + 2NH_3$.

This final reaction is more and more closely approximated by raising the temperature of the reaction mixture, and is substantially complete at the boiling point of the liquid. At temperatures between 34° C. and the boiling point, the two reactions (1) and (2) take place simultaneously, the reaction tending to go more and more in the direction represented by the Equation (2) as the temperature is raised, and in the direction represented by Equation (1) as the temperature approaches 34° C. At the lower temperatures within this range, the silica product, which I designate alpha silica, is of a translucent character. By increasing the temperature at which the reaction is conducted, the transparency of the product is correspondingly increased and becomes greatest at or near the boiling point of the liquid. In carrying out the reaction at such higher temperatures, it is preferable to employ the silicon diammino tetrafluoride as a vapor, bringing it in contact with the liquid.

The alpha-silica product obtained in accordance with this invention is separated from the aqueous liquid in which it is formed in the usual manner, for example, by filtration, and the precipitate washed either directly on the filter or by removing it from the filter, forming it into a slurry with the wash water and again filtering.

The alpha-silica precipitate secured in this manner has unique and highly desirable properties. Its water of hydration is but loosely combined as it retains only about 2% of water on drying at 110° C. The silicious material, as secured by filtration, retains its volume and water content on repeated repulping and filtering, holding about 70% of water. Its volume density is low, the air dried precipitate weighing 10 to 14 lbs. per cubic foot. On drying it forms a coherent mass, which hardens on calcining. The material is highly plastic, and by reason of its plasticity, its low density, and its hardening on calcining, it is highly suitable for use as an insulator in the form of powder, or in blocks or cakes, particularly since it may be formed without the addition of a binder by reason of its own plasticity.

Its index of refraction is about 1.47, its particle size being extremely small. When used as a pigment, it is translucent in linseed oil, having a transparency as great or greater than that of commercial light aluminum hydrate. It is transparent in resin oil and resin solutions, and in cellulose and resin lacquers, but is opaque in water paints, such as casein paints. It is thus useful as a colorless extender in paints and varnishes and cellulose lacquers and as an opaque pigment in cold water paints. When used in paints, lacquers and the like, it acts as a dispersing agent, preventing rapid settling of other pigment particles, and it markedly increases the brushing out qualities of the coating composition and imparts a smoothness to the resulting surface. It has an excellent adsorptive character and is hence very valuable for the formation of lakes.

The alpha-silica product prepared by the present invention may be calcined at high temperatures without change in physical properties. By heating to temperatures of 250 to 300° C., any traces of fluorine left in the product are vaporized. It may be heated to 500 to 600° C. without change in its physical properties and calcining to temperatures of 500° C. upwardly, say to about 800° C. increases the transparency of the product.

The following examples illustrate the present invention, which, however, is not to be regarded as limited to the details set forth herein.

Example No. 1

1 part of silicon diammino tetrafluoride is added to 2.5 parts by weight of boiling water and the mixture agitated, for example, in a porcelain or rubber lined ball mill for a suitable period, say one-half hour. Steam may be supplied to secure a temperature of at least 34° C. and preferably the reaction mixture is maintained at approximately the boiling point of water. The silicon diammino tetrafluoride is converted into the alpha form of precipitated silica as hereinbefore described, and ammonium silicofluoride. The mixture is filtered hot and the separated silica is repulped in a suitable mixer or in a ball mill for a number of times, being separated each time by filtration or by countercurrent washing and settling. It is then dried and may be pulverized or preferably is calcined and then pulverized. It is preferably pulverized after air drying and before calcining, since the calcined filter cake is hard and adhesive.

The hot filtrate is cooled to crystallize out ammonium silicofluoride, and the mother liquor is returned and used in reaction on fresh silicon diammino tetrafluoride. The dissolved ammonium silicofluoride and ammonia contained in this liquor do not interfere with the reaction of the silicon diammino tetrafluoride and water present. The presence of the ammonia in the mother liquor may tend to cause some reaction with formation of another form of precipitated hydrated silica, which I designate beta-silicate and which I have described in my prior applications above referred to and in my copending application Serial No. 547,781, filed June 29, 1931. If it is desired to avoid such formation of beta-silica, the mother liquor may be neutralized, for example, with hydrofluoric or hydrofluo-silicic acid, before it is returned for further reaction with silicon diammino tetrafluoride. If desired, the ammonium silicofluoride formed by the reaction of the silicon diammino tetrafluoride above described may be converted to the beta form of precipitated hydrated silica either after separation of the alpha silica or in the presence of the latter, to form a mixed product, as more fully described and claimed in my copending application Serial No. 547,781, filed June 29, 1931, above referred to.

The silicon diammino tertafluoride may be used in the reaction in vapor form; for example, the vapors obtained by the reaction of ammonium fluoride or ammonium bifluoride on silicas or silicates can be contacted directly with water or separated silicon diammino tetrafluoride can be revolatilized and the vapors brought into contact with water or the aqueous liquid employed. By using the silicon diammino tetrafluoride in vapor form, certain advantages are secured; for example, the reaction between the compound and the water of the aqueous liquid is practically instantaneous; the particles of precipitated silica are of extremely minute size and aggregates of particles are not formed, as may be the case when the material is contacted in solid form with solid form or aqueous liquid. The following example illustrates the conduct of the reaction, employing vapors of silicon diammino tetrafluoride.

Example No. 2

The furnace vapors from the reaction of ammonium fluoride or ammonium bifluoride on quartz, clay, or other siliceous oxygen compound, as described, for example, in my prior applications Serial Nos. 425,671 and 425,345, above referred to, which furnace vapors contain ammonia and silicon diammino tetrafluoride, are brought into contact with a descending stream of water or aqueous liquid in a tower or scrubber of any suitable character, for example, of ceramic material or preferably a non-corrodible ferrous alloy, suitable packing material being present, as is customary, for the distribution of the liquid. The temperature within the scrubber is kept above 34° C., and preferably near 100° C. by the heat of the vapors of the silicon diammino tetrafluoride, cooling being employed, if required, to prevent excessive vaporization of steam. The alpha form of the hydrated silica is precipitated and water and ammonia vapors are driven off. The liquor removed from the tower consists of a solution of ammonium silicofluoride and ammonium fluoride containing the very finely divided alpha silicate in suspension, and is preferably filtered hot to remove the latter. The alpha silica is washed as hereinbefore described. Excess of ammonium silicofluoride may be crystallized out of the mother liquor, which may be returned for reaction with the vapors of silicon diammino tetrafluoride, additional water being employed as required.

I claim:

1. The method of producing a precipitated silica which comprises contacting silicon diammino tetrafluoride with an aqueous liquid while maintaining a temperature of about the boiling point of water.

2. In the method of producing a precipitated silica wherein silicon diammino tetrafluoride is contacted with an aqueous liquid, the step of controlling the relative amount and character of the silica product which comprises maintaining the reaction mixture at a controlled temperature between 34° C. and the boiling point of the liquid.

3. The method of producing a precipitated silica which comprises contacting silicon diammino tetrafluoride with an aqueous liquid, and heating the liquid to secure a controlled temperature of the reaction mixture between 34° C. and the boiling point of the liquid, thereby securing desired transparency characteristics of the precipitated silica.

4. The method of producing a precipitated silica which comprises contacting silicon diammino tetrafluoride with an aqueous liquid, and introducing steam into contact with the reaction mixture to heat the latter to approximately the boiling point of the aqueous liquid.

5. The method of producing precipitated silica which comprises contacting silicon diammino tetrafluoride with an aqueous liquid, introducing steam into contact with the reaction mixture, thereby heating it to approximately the boiling point of the aqueous liquid and driving off ammonia vapors, and removing ammonia vapors from the presence of the reaction mixture.

6. The method of producing precipitated silica which comprises contacting silicon diammino tetrafluoride vapors with water, thereby cooling said vapors and causing reaction between them and the water.

7. The method of producing precipitated silica which comprises treating silicon diammino tetrafluoride with water in the presence of ammonia while maintaining a temperature at about the boiling point of water.

8. The method of producing precipitated silica which comprises treating silicon diammino tetrafluoride with water in the presence of ammonia and heating the mixture to a controlled temperature between 34° C. and about the boiling point of water, thereby controlling the characteristics of the silica product.

9. The method of producing a precipitated silica which comprises contacting a mixture of ammonia and silicon diammino tetrafluoride vapors with water while maintaining the reaction mixture at about the boiling point of water.

10. The method of producing precipitated silica which comprises contacting silicon diammino tetrafluoride with water while maintaining a temperature of about the boiling point of the liquid, thereby forming precipitated silica, removing precipitated silica from the liquid and again contacting the liquid with additional silicon diammino tetrafluoride while maintaining a temperature at or near the boiling point of the liquid.

11. The method of producing precipitated silica which comprises contacting silicon diammino tetrafluoride with water in the presence of ammonia, while maintaining a temperature at about the boiling point of the liquid, thereby forming precipitated silica, removing precipitated silica from the liquid and again contacting the liquid while near its boiling point with additional silicon diammino tetrafluoride.

12. The method of producing precipitated silica which comprises contacting a mixture of ammonia and silicon diammino tetrafluoride vapors with water while maintaining a temperature at about the boiling point of the liquid, thereby forming precipitated silica, removing precipitated silica from the liquid, and again contacting the liquid with additional mixed vapors of ammonia and silicon diammino tetrafluoride while maintaining the liquid at about its boiling point.

13. The method of producing precipitated silica which comprises contacting silicon diammino tetrafluoride vapors with an aqueous solution of ammonium fluoride in the presence of ammonia, while maintaining a temperature near 100° C., thereby forming precipitated silica in said solution, removing precipitated silica from said solution, and returning the solution with additional water and again contacting it with silicon diammino tetrafluoride vapors while maintaining a temperature near 100° C.

14. In the method of producing precipitated silica wherein silicon diammino tetrafluoride is caused to react with water, the steps of subjecting the resulting silica containing traces of fluorine to a temperature of from 250° C. to 500° C., thereby removing traces of fluorine without change in physical properties.

15. In the method of producing precipitated silica wherein silicon diammino tetrafluoride is contacted with water, the steps of washing and drying the precipitated silica, said silica containing traces of fluorine and heating it to a temperature of from 250° C. to 500° C., thereby removing traces of fluorine from the product.

16. The method of producing precipitated silica which comprises contacting silicon diammino tetrafluoride vapors with an aqueous liquid in the presence of ammonia, thereby forming precipitated silica, removing precipitated silica from said solution, washing ammonium fluorides from said silica, drying and heating said silica to at least 250° to 300° C. to remove residual ammonium fluoride.

17. The method of producing precipitated silica which comprises contacting silicon diammino tetrafluoride vapors with an aqueous liquid in the presence of ammonia, thereby forming precipitated silica, removing precipitated silica from said solution, washing ammonium fluoride salts from said silica, drying and heating said silica to at least 500° C., thereby removing residual ammonium fluoride and increasing the transparency of the silica.

18. The method of producing a precipitated silica which comprises contacting silicon diammino tetrafluoride with an aqueous liquid, thereby forming precipitated silica and ammonium fluosilicate, removing the precipitated silica from the liquid, crystallizing ammonium fluosilicate from the separated liquid, and subjecting the separated liquid to further treatment with silicon diammino tetrafluoride, to form additional precipitated silica.

19. The method of producing a precipitated silica which comprises contacting silicon diammino tetrafluoride with an aqueous liquid while heating the latter to about the boiling point of the liquid, thereby forming precipitated silica, separating the precipitated silica from the hot liquid, cooling the latter, thereby crystallizing out ammonium fluosilicate, and separating the latter and contacting the separated liquid with additional silicon diammino tetrafluoride.

20. A plastic precipitated, hydrated silica containing about 2% of water and having an apparent density of 10 to 14 pounds per cubic foot, produced by reaction between silicon diammino tetrafluoride and an aqueous liquid and freed from traces of fluorine by heating to a temperature of at least 250° C.

21. A plastic, precipitated, hydrated silica containing about 2% of water and having an apparent density of 10 to 14 lbs. per cubic foot, produced by reaction between silicon-diammino-tetrafluoride and an aqueous liquid and having increased transparency resulting from heating to a temperature of at least 500° C.

22. The method of producing a precipitated silica which comprises contacting a mixture of ammonia and silicon diammino tetrafluoride vapors with water, thereby cooling said vapors and causing a reaction between them and the water.

23. The method of producing precipitated silica which comprises contacting silicon diammino tetrafluoride vapors with water in the presence of ammonia, thereby cooling the silicon diammino tetrafluoride vapors and causing reaction to form precipitated silica.

SVEND S. SVENDSEN.